US009022282B2

(12) United States Patent
Tsongas et al.

(10) Patent No.: US 9,022,282 B2
(45) Date of Patent: May 5, 2015

(54) SYSTEMS AND METHODS FOR IMPLEMENTING VIRTUAL CUSTOMER REPLACEABLE UNIT MONITORS FOR SOLID INK CUSTOMER REPLACEABLE UNITS IN MANAGED PRINT SERVICE ENVIRONMENTS

(71) Applicant: XEROX Corporation, Norwalk, CT (US)

(72) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 151 days.

(21) Appl. No.: 13/776,654

(22) Filed: Feb. 25, 2013

(65) Prior Publication Data

US 2014/0239056 A1    Aug. 28, 2014

(51) Int. Cl.
*G06F 17/00* (2006.01)
*B41J 29/00* (2006.01)
*G06K 19/06* (2006.01)
*G06K 7/12* (2006.01)
*B41J 2/175* (2006.01)

(52) U.S. Cl.
CPC ........... *B41J 29/00* (2013.01); *G06K 19/06093* (2013.01); *G06K 19/0614* (2013.01); *G06K 7/12* (2013.01); *B41J 2/17593* (2013.01)

(58) Field of Classification Search
USPC .......... 235/375, 462.04, 462.13, 462.42, 468; 356/51; 347/23
See application file for complete search history.

(56) References Cited

U.S. PATENT DOCUMENTS

| 6,126,265 A | * | 10/2000 | Childers et al. ................. 347/23 |
| 6,351,621 B1 | | 2/2002 | Richards et al. |
| 2008/0297767 A1 | * | 12/2008 | Goren et al. .................... 356/51 |

* cited by examiner

*Primary Examiner* — Karl D Frech
(74) *Attorney, Agent, or Firm* — Ronald E. Prass, Jr.; Prass LLP (57) ABSTRACT

A system and method are provided for implementing virtual customer replaceable unit monitors (CRUMs) for solid ink customer replaceable units (CRUs) that are used in image forming devices, particularly in managed print service environments. Molded products, including solid ink elements, are marked to aid in generally effecting identification and/or authenticity verification, and/or in specifically effecting compatibility matching in an image forming device in which the solid ink CRUs are used. One or more ultraviolet (UV) ink based two dimensional 2D barcodes are provided on a solid ink CRU for identification of the solid ink CRU by a reading mechanism in an image forming device. The use of a UV ink that is not easily visually discernible provides a level of protection against easily detecting, and attempting to copy the identifying information. The image forming process would essentially consume the virtual CRUM on the solid ink CRU in image processing.

25 Claims, 4 Drawing Sheets

SYSTEMS AND METHODS FOR IMPLEMENTING VIRTUAL CUSTOMER REPLACEABLE UNIT MONITORS FOR SOLID INK CUSTOMER REPLACEABLE UNITS IN MANAGED PRINT SERVICE ENVIRONMENTS

BACKGROUND

1. Field of the Disclosed Embodiments

This disclosure relates to systems and methods for implementing virtual customer replaceable unit monitors (CRUMs) for solid ink customer replaceable units (CRUs) that are used in image forming devices, particularly in managed print service environments.

2. Related Art

All manner of image forming devices make use of customer replaceable consumable products, such as inks and toners, and otherwise include customer replaceable components or units, many of which are routinely replaceable based on a limited service life. In instances, the service life of a particular CRU may be tracked and measured, for example, according to a number of image forming operations that the CRU may undertake. Depending on a level of sophistication in the image forming device, a customer or end-user may be provided some feedback regarding a condition of a limited-service-life CRU, including a remaining level of a particular consumable in the image forming device. Customers and end-users may be provided with alerts to warn them regarding an impending end-of-service-life condition for the CRU, including pending exhaustion of a particular consumable in the image forming device.

Image forming devices often make beneficial use of a capacity to externally monitor the status of the one or more CRUs in the image forming devices. The monitoring of the CRUs is often implemented by way of an electronically-readable module associated with the CRU for uniquely identifying the CRU and for potentially monitoring one or more characteristics of the CRU. Information regarding the CRU can include static information, i.e., information that does not change over the usable service life of the CRU, such as a model or serial number and/or compatibility of the CRU with the image forming device within which the CRU is installed. In some installations, monitoring modules can be used to record, in an electronically-readable format, dynamically changing information relating to a particular operating characteristic of the CRU.

U.S. Pat. No. 6,351,621 to Richards et al., which is commonly assigned and the disclosure of which is incorporated herein by reference in its entirety, discloses CRUs that are augmented with electronically-readable/writable monitoring chips containing static information for identification of the CRU, and/or dynamic information relating to an operating status of the CRU. Richards refers to such electronically-readable/writable monitoring chips as customer replaceable unit monitors or CRUMs.

Richards explains that, when an individual CRU is installed in an image forming device, communication is established with the CRUM located within, or externally mounted to, the individual CRU. The CRUM enables the image forming device to identify the CRU, track one or more characteristics of the CRU by reading data from, and potentially update the information contained by writing data to the CRUM.

Companies that manufacture and sell image forming devices generate substantial post-sale revenue from the separate business of selling replacement CRUs to customers and end-users to which they have previously sold the image forming devices. Based on the significant revenue that may be available in the marketplace for replacement CRUs, recent years have witnessed a significant growth in companies whose sole business is to manufacture, remanufacture, refurbish, refill, or otherwise produce counterfeit or copies of (often referred to as "gray" market) replacement CRUs for use in other companies' image forming devices. The steep increase in the growth of companies manufacturing and selling "gray" market CRUs adversely affects the companies that manufacture and sell the image forming devices for customers and/or end-users. There are measurable economic effects based on the loss of revenue from the customers and/or end-users purchasing replacement CRUs from sources other than the image forming device manufacturers, or those authorized and licensed by the device manufacturers. More subtle, however, are the intangibles such as the potential for an impact on the reputation of the image forming device manufacturer in instances where, for example, specific users experience poor image quality for images produced on a particular image forming device without recognizing that the fault may lie not with the image forming device itself, but rather with the quality of the less-than-optimally-compatible replacement CRUs that have been procured from other sources and installed in the image forming device.

In order to combat the proliferation of "gray" market components, device manufacturers are taking affirmative steps to address the issue. The schemes employed by the image forming device manufacturers may include contractual schemes such as specifically warning their customers and/or end-users that the use of non-company manufactured replacement CRUs in a particular image forming device will invalidate any warranty protection on the image forming device. There will remain, however, customers and/or end-users that are willing to accept voiding the warranty as a trade-off for potential cost savings and other incentives that may be associated with procuring and using "gray" market replacement CRUs.

SUMMARY OF DISCLOSED SUBJECT MATTER

Image forming device manufacturers often rely on programmable CRUMs that are readable by the image forming devices within which the CRUs with which the CRUMs are associated to provide readable authenticating information to the image forming devices when the CRU is installed. The CRUM may be read to by the image forming device to confirm that the CRU is compatible with, and authorized for operation in, the image forming device. Failure to provide this confirmation in a "handshake" between the image forming device and the CRU may result in inhibiting operation of the image forming device with an incompatible or unauthorized CRU. These mechanisms and schemes may aid in thwarting the efforts of producers and consumers of counterfeit or copied products. An objective of the schemes is to provide a mechanism by which the replacement CRU and the device into which replacement CRU is installed are made to "communicate," the devices being programmed to "recognize" only authorized and compatible replacement CRUs produced by, or under a license with, the device manufacturer.

While extensive beneficial use is made of capabilities to externally monitor operating conditions of myriad CRUs via CRUMs, CRUMs may be incompatible with certain CRU products. The role of the CRUM may, in certain circumstances, need to be replaced by some other scheme. An image forming device manufacturer in a toner-based product may be afforded the option of using a CRUM to allow for better tracking and management of print CRUs. This same option may not, however, work with solid ink CRU based devices. Solid ink CRUs do not include a carrier, e.g., a toner bottle or other molded product, for the CRU to which a CRUM may be attached. Rather, in the case of a solid ink CRU component, the CRU itself is completely consumed within the image forming device.

In view of the above, it would be advantageous to provide a simple mechanism that is compatible with a solid ink CRU for providing non-visually discernible readable information on the solid ink CRU to confirm compatibility and authority for use of the solid ink CRU in the particular image forming device in which the solid ink CRU is installed for use. The readable information may include data by which to uniquely identify the solid ink CRU to the device and to confirm authenticity and/or compatibility of the solid ink CRU with the device. Failure to pass certain comparison or mating tests in the device may lead the device itself to inhibit further internal operations until the situation is corrected.

Figure 1:
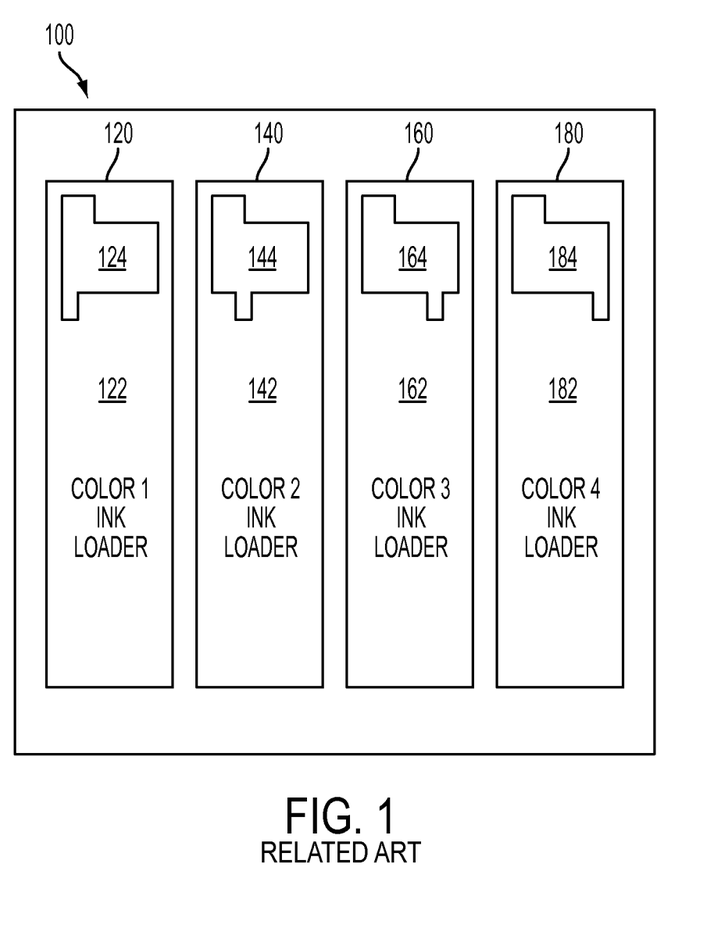
FIG. 1 illustrates a simple block diagram of an exemplary set of four (four color) solid ink element storage and supply devices with which solid ink CRUs marked according to the systems and methods of this disclosure may be used.

FIG. 1 illustrates a simple block diagram of an exemplary set 100 of four color solid ink storage and supply devices 120,140,160, 180. Each of the four solid ink storage and supply devices 120,140,160,180 consists of a color N ink loader 122,142,162,182, which includes a specifically-configured ink element insertion opening 124,144,164,184, through which the customer inserts replacement solid ink elements. The specifically-configured ink element insertion openings 124,144,164,184 may be configured to allow for only the passage of a particularly-colored (configured) solid ink element with an outer physical profile that, in cross section, corresponds to only one of the ink element insertion openings 124,144,164,184. In this manner, only inks of a single color with a corresponding profile may be routinely introduced into each color N ink loader 122,142,162,182. A first order compatibility may thus be provided by "keying" a physical configuration profile of the replacement solid ink element to a single one of the specifically-configured ink element insertion openings 124,144,164,184, comparable to a key profile for a lock, in an increasingly sophisticated manner that may be increasingly difficult to replicate.

Exemplary embodiments of the systems and methods according to this disclosure may mark molded products, including solid ink elements, in a manner that may aid in generally effecting identification and/or authenticity verification, and/or in specifically effecting, for example, compatibility matching in an image forming device in which the solid ink elements are intended to be used.

Exemplary embodiments may provide one or more ultraviolet (UV) ink based two dimensional 2D barcodes on a solid ink CRU for identification of the solid ink CRU by a reading mechanism in an image forming device. The use of a UV ink that is not easily visually discernible provides a level of protection against easily detecting, and attempting to copy the identifying information.

Exemplary embodiments may provide a compatible reading mechanism for use in an image forming device to allow for a unique identifier applied to solid ink CRU to be illuminated with UV light and uniquely identified, for example, for use in a managed service environment.

In embodiments, the inclusion of UV ink may be accomplished in such a manner to as to not negatively affect the image quality of images generated in the image forming device.

In embodiments, the image forming process would essentially consume the virtual CRUM on the solid ink CRU.

Exemplary embodiments may visually machine-inspect the solid ink CRU to identify and authenticate the solid ink CRU for use based on a comparison of stored information that the image forming device may compare with the information read from the solid ink CRU by the image forming device.

Exemplary embodiments may facilitate an image forming device, or other device with which a particular molded product CRU may be associated, identifying, authenticating and/or verifying compatibility of, the particular CRU when it is installed in the device. UV-augmented visual machine inspection of a solid ink CRU may be according to well-established practices.

Exemplary embodiments may find utility beyond image forming devices in applications in external inspection, including machine inspection, of medical device disposables. Identification and authentication may be facilitated, using for example portable verification devices, of virtually all molded products made available to customers, end-users, intermediate manufacturers, assemblers, suppliers, and the like.

Exemplary embodiments may be advantageously employed in an effort to curtail adaptability and use of counterfeit or copied replacement CRUs in devices, including image forming devices, by largely rendering the counterfeit and copied components generally incompatible with the devices, including image forming devices, which may employ them.

Exemplary embodiments may be used to curb the proliferation of all "gray" market molded components by providing a broadened basis for identification, authentication and/or compatibility verification with regard to any manner of molded products.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing virtual customer CRUMs for solid ink CRUs for that may be used in image forming devices, particularly in managed print service environments, will be described, in detail, with reference to the following drawings, in which.

DETAILED DESCRIPTION OF THE DISCLOSED EMBODIMENTS

The systems and methods for implementing virtual CRUMs for solid ink CRUs for use in image forming devices in managed print service environments according to this disclosure will generally refer to these specific utilities for those systems and methods. Exemplary embodiments described and depicted in this disclosure should not be interpreted as being specifically limited to any particular configuration of a solid ink CRU component, or to any particular characteristics of a particular image forming device component for "reading" identifying information from the solid ink CRU. Any advantageous use of a non-visually discernible label on a solid ink CRU, or other molded part, employed in an image forming device according to the systems and methods according to this disclosure is contemplated as being included in embodiments according to this disclosure. Exemplary embodiments described and depicted in this disclosure should not be interpreted as being specifically limited, for example, to any particular configuration of a surface imaging device, including but not limited to, a camera or other visual imaging device.

Specific reference to, for example, any particular molded product, such as a solid ink CRU component, should be understood as being exemplary only, and not limiting, in any manner, to any particular class of molded products. The systems and methods according to this disclosure will be described as being particularly adaptable to identification of solid ink CRU elements for use in solid (or phase-change) inkjet image forming, printing and/or copying devices. These references are meant to be illustrative only in providing a single real-world utility for the disclosed systems and methods, and should not be considered as limiting the disclosed systems and methods to any particular molded product. References to installation of a replacement CRU in a device are also meant to be illustrative and not limiting to the many varied classes of molded products that may be inspected or to the devices used to inspect those CRUs. No limitation is further applied to any particular type of device in which CRUs may be used.

Since simple molded consumables, including solid ink consumables, are often the profit stream of an individual device platform after initial sale and/or installation of the individual device platform, it is highly desirable to ensure that replacement molded consumables only come from an approved source, such as a manufacturer, or authorized/licensed supplier, and not from copiers, counterfeiters, or gray market manufacturers. The disclosed schemes may facilitate this process with regard to molded consumables, including solid ink consumables, by marking those molded consumables in a manner that is not easily visually discernible, and then machine inspecting the molded consumables to compare information provided in the marking with a stored database of comparison information in the device.

Figure 2:
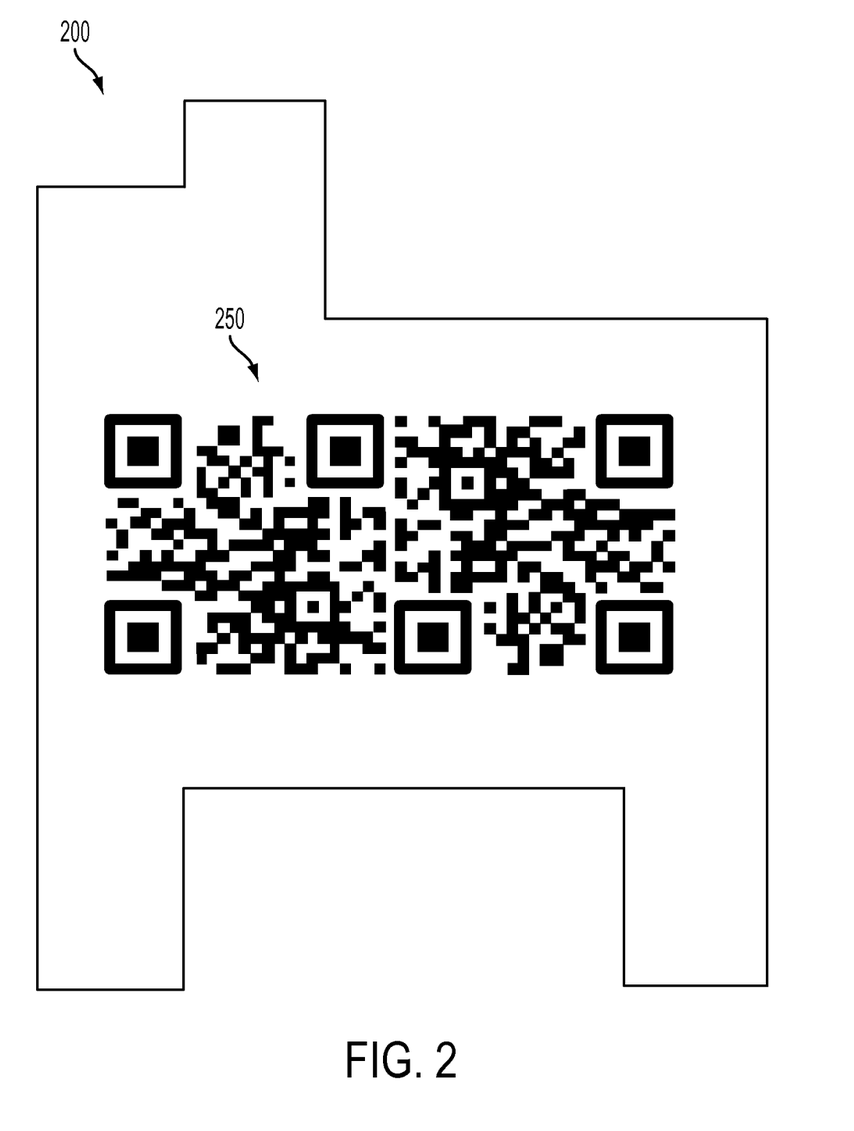
FIG. 2 illustrates an exemplary embodiment of a 2D label that may be provided on a solid ink CRU using a UV ink according to this disclosure.

The disclosed schemes may add a 2D barcode to solid ink CRUs using a UV based ink so as to make the barcode readable under UV light and not generally visible under ambient and/or visible lighting conditions. The UV ink may be added in a manner so as to not have a negative effect on the image quality of images formed by the image forming device in which the solid ink CRU is installed for use. The disclosed schemes may also not be adversely affected by the color of the particular solid ink (stick) CRU as the UV barcode would fluoresce allowing for reading with any color solid ink stick. According to the disclosed schemes, a device manufacturer or supplier may, via certain support (backend) systems, be able to monitor a flow of marked supplies from manufacturing through a stream of commerce to a final destination installation in an image forming device by, for example, a use of the UV barcodes along with package barcodes. FIG. 2 illustrates an exemplary embodiment of a 2D label 250 that may be provided on a solid ink CRU 200 having an intricate outer profile, the 2D label 250 being disposed on a readable face of the solid ink CRU using a UV ink according to this disclosure.

There are a number of exemplary scenarios for the use of such virtual CRUM methods for solid ink CRUs. Among those scenarios are the following.

In a first scenario, Company A may have a fleet of image forming devices with 50% under management of a device manufacturer. Machine X may be a managed device while Machine Y may not be a managed device. Solid ink components may be provided to Company A as part of the contract for managing Machine X. A user of Machine Y may need solid ink for that machine, and may find an allegedly compatible solid ink product in a supply cabinet dedicated to Machine X. The solid ink component may be physically insertable in Machine Y. When the solid ink component, however, is "read" by a UV barcode reader in Machine Y, it may be rejected as an invalid component requiring removal, and otherwise inhibiting image forming operations in Machine Y until the difficulty is corrected.

In a second scenario, Company B may have a fleet of image forming devices with 50% under management of a device manufacturer. Machine P may be a managed device while Machine Q may not be a managed device. Solid ink components may be provided to Company B as part of the contract for managing Machine P. A user of Machine Q may need solid ink for that machine, and may find an allegedly compatible solid ink product in a supply cabinet dedicated to Machine P. The solid ink component may be physically insertable in Machine Q. When the solid ink component is inserted into Machine Q and passes by a UV barcode reader, a UV barcode on the solid ink component may be deciphered and indicated as being intended for the managed device, Machine P. The user may be presented with an option to enter, via a user interface or otherwise, some form of a "release code." The release code may be purchased from the device manufacturer, even over the Internet, and when entered in Machine Q, may allow Machine Q to operate with the solid ink component identified for use in Machine P.

In a third scenario, Company C may have a fleet of image forming devices with 100% under management of a device manufacturer. Machine R and Machine S may both be managed devices. Machine R, being low on cyan ink, may automatically generate a shipment request for cyan ink for Machine R. The cyan ink ordered by Machine R may arrive and be incorrectly loaded in Machine S, which does not as urgently need the cyan ink CRU. The solid cyan ink CRU, when inserted into Machine S, may pass the UV barcode reader and the barcode may be deciphered to show that the solid cyan ink CRU is intended for Machine R. Machine S may present a message on some form of user interface, including an integral Graphical User Interface (GUI), that the installed solid cyan ink CRU is intended for Machine R and the solid cyan ink CRU may be rejected requiring removal or other action being taken on the part of the user to manually authorize the use of the solid cyan ink CRU in Machine S.

In a fourth scenario, Company D may operate a solid ink image forming device that may have been purchased from the device manufacturer/supplier at a significant discount in view of a contractual agreement that replacement supplies for solid ink image forming device will be procured through a program managed by the device manufacturer/supplier that monitors usage, potentially through an Internet connection from the device back to the device manufacturer/supplier. Solid ink from another supplier is installed in the machine. The solid ink, when inserted into the machine, passes by a UV barcode reader. The barcode information is transmitted to Xerox and found to be from a 3rd party which violates the agreement. The solid ink is rejected as an invalid stick requiring removal.

In embodiments, if the solid ink CRU is rejected and the image forming device may not provide a mechanism for easy removal of the rejected solid ink CRU, an option may be provided in the image forming device to allow printing. Once the identified invalid solid ink CRU reaches the print head, the image forming device may be programmed (forced) to melt the identified invalid solid ink CRU to a waste reservoir so as to dispose of the identified invalid solid ink CRU. This exemplary embodiment of the disclosed processing for identified invalid solid ink CRUs may allow for printing to continue, but would force rapid consumption of the identified invalid solid ink CRU. This method would only be used as an option under specific criteria as it could prove to be a customer dissatisfier. On the other hand, this method would likely thwart user efforts to avoid contractual obligations requiring use of only authorized and compatible solid ink CRUs.

In embodiments, even in circumstances where some damage is caused to the 2D labeling barcodes), common error correction algorithms and techniques may render the damaged codes readable and subject to interpretation. Handling of codes which are rendered unreadable or which are not present can be specified, for example, in a non-volatile memory (NVM) for the image forming device. The device manufacturer may include a routine that forces the device to reject such solid ink CRUs, or otherwise may include a routine that merely presents on, for example, a GUI in the image forming device, a message to a user that the image quality for images produced by the device may be degraded due to the presence of an unauthorized or incompatible solid ink CRU.

The image forming device may be programmed to store information regarding all detected anomalous conditions resulting from presence of incompatible or unauthorized solid ink CRUs, as determined by the reading of the UV labeling printed thereon.

The disclosed schemes may provide an ability to track image quality defects resulting from the presence of invalid solid ink CRUs in the image forming device. Customer complaints about print quality may be tracked, for example, back to the manufacturing process to identify possible problems resulting from the manufacture of solid ink CRUs.

The disclosed schemes would not require special molding at additional cost for the involved solid ink CRUs. A benefit would be that the solid ink CRUs could be mass produced with the same molds according to known methods. The disclosed 2D labeling (barcodes) may be applied at time and point of production of the solid ink CRU. For more flexibility, the 2D labeling could be applied to the produced solid ink CRUs on an as needed basis allowing for purposing of particular batches of solid ink CRUs based on demand. For example, if individual sold ink CRUs are produced without printed 2D barcodes at the point of processing, labeling schemes could be modified to meet particular market demands that may exceed particular expectations. Post-processing could be flexibly employed to provide identified batches of solid ink CRUs to address particular market demands.

The systems and methods according to this disclosure may provide flexible means by which to individually identify solid ink CRUs by attaching a 2D labeling, such as a barcode, as a virtual CRUM for the solid ink CRUs. Appropriately marked solid ink CRUs may provide better control over the use and destination of the solid ink CRUs. Image forming device customer satisfaction may be enhanced by correctly routing supplies in a managed service arrangement allowing for better up-time and by avoiding possible inferior third party solid ink CRUs. As is mentioned above, no special and costly unique molding of solid ink CRUs is required to implement the disclosed identification schemes.

When the "marked" solid ink CRU is installed in a particular image forming device, the device may employ a UV illumination unit and a cooperating reading unit such as, for example, a camera, to read the 2D labeling on the solid ink CRU and to compare the read 2D labeling 250 to stored information associated with the image forming device. UV illuminated visual machine inspection of the solid ink CRU may be according to known methods and well-established practices. An amount of detail to be provided would be selectable according to a sophistication of the device/solid ink CRU manufacturer and a desire of the device/solid ink CRU manufacturer to protect the solid ink CRUs from counterfeiting and/or copying.

Separately, a reading device with a comparable illuminating and reading unit may be provided for reading the "marked" solid ink CRU for compatibility apart from, or prior to, being installed in a particular image forming device, or for reading and verifying the identity of virtually any "marked" molded product. The reading device may be a handheld or otherwise portable device, such as a smartphone, an iPhone®, an iPad®, a laptop/notebook/tablet computer, a personal digital assistant, a programmable camera, a handheld information (barcode or glyph) reader, or other like device, or a scanning or camera component associated with a larger computation system. The reading device may be virtually any programmable portable or fixed system that includes a cooperating illuminator and camera or other surface imaging device that may be used to read a UV readable 2d labeling on a solid ink CRU, or other molded product, and to compare the read information with identifying information stored in or accessible by the reading device.

Figure 3:
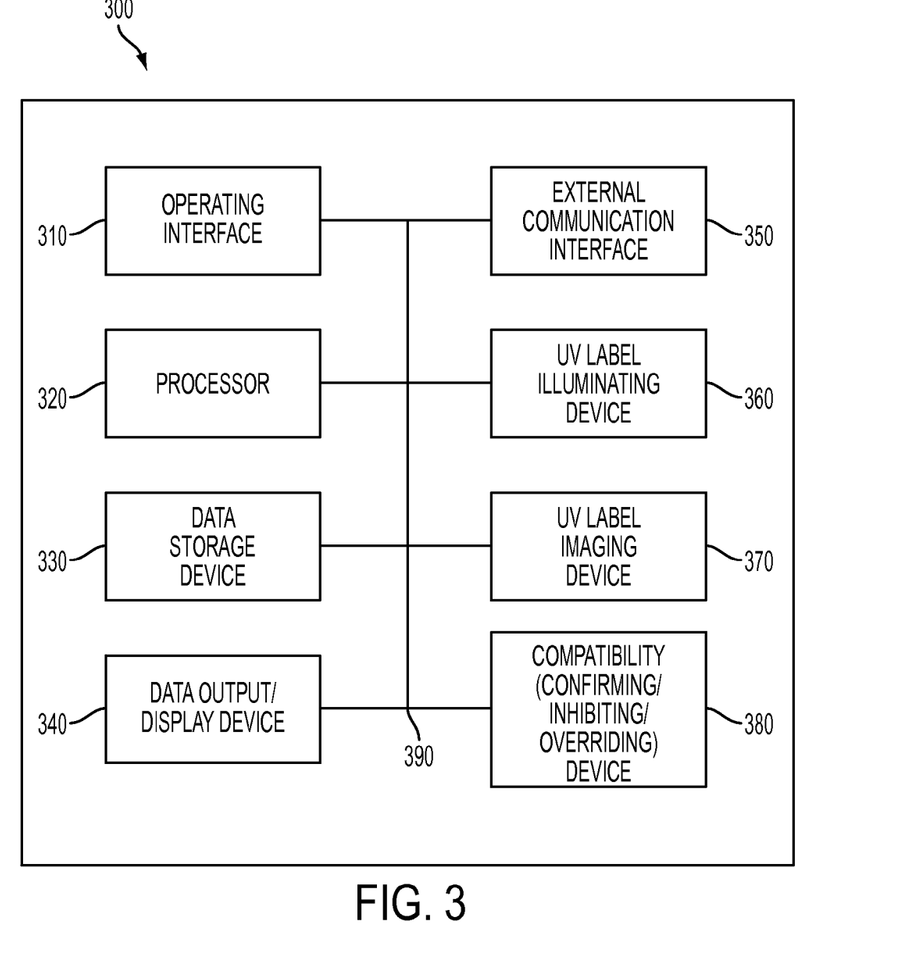
FIG. 3 illustrates a block diagram of an exemplary solid ink CRU authenticating device for effecting an authentication process in an image forming device according to this disclosure.

FIG. 3 illustrates a block diagram of an exemplary solid ink CRU authenticating device 300 for effecting an authentication process in an image forming device according to this disclosure. It should be recognized that the exemplary device 300, in embodiments of certain of the features described below, may be used to identify a solid ink CRU according to the disclosed schemes, but all of the component elements of the exemplary device 300 shown in FIG. 3 may not be a part of any particular single device or unit according to this disclosure.

The exemplary device 300 may include an operating interface 310 by which a user may communicate with the exemplary device 300. The operating interface 310 may be a locally accessible user interface associated with an image forming device, or a device for "reading" a surface of a solid ink CRU. The operating interface 310 may be configured as one or more conventional mechanisms common to control devices and/or computing devices that may permit a user to input information to the exemplary device 300. The operating interface 310 may include, for example, a conventional keyboard, a touchscreen with "soft" buttons or with various components for use with a compatible stylus, a microphone by which a user may provide oral commands to the exemplary device 300 to be "translated" by a voice recognition program, or other like device by which a user may communicate specific operating instructions to the exemplary device 300. The operating interface 310 may be a part of a function of a graphical user interface (GUI) mounted on, integral to, or associated with, the image forming device.

The exemplary device 300 may include one or more local processors 320 for individually operating the exemplary device 300 and for carrying out the operating functions of the solid ink CRU reading methodologies, including the reading of the UV ink-applied 2D labeling, to include a readable encrypted legend that identifies the solid ink CRU when appropriate illuminating conditions are applied to the labeled solid ink CRU. Processor(s) 320 may include at least one conventional processor or microprocessor that interprets and executes instructions to direct specific functioning of the exemplary device 300.

The exemplary device 300 may include one or more data storage devices 330. Such data storage device(s) 330 may be used to store data or operating programs to be used by the exemplary device 300, and specifically the processor(s) 320. Data storage device(s) 330 may be used to store information regarding marks that may be associated with solid ink CRUs that are compatible with, or otherwise authorized for use in a particular image forming device with which the stored information is associated and in which the labeled solid ink CRU may be employed. The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary device 300, or may be provided external to, and in wired or wireless communication with, the exemplary device 300.

The exemplary device 300 may include at least one data output/display device 340, which may be configured as one or more conventional mechanisms that output information to a user, including a display screen on a GUI of an image forming device. The data output/display device 340 may be usable to, for example, display to a user a result of a solid ink CRU identification scheme executed by the exemplary device 300. When configured as a function of a GUI in the image forming device, the data output/display device 340 and the operating interface 310 may cooperatively update a user as to an operating condition of the image forming device and the exemplary system 300, may display identification results and may display an interface to which the user may make entries via the operating interface to respond to, for example, a detected non-compatibility of the solid ink CRU with the image forming device according to the disclosed schemes.

The exemplary device 300 may include one or more separate external communication interfaces 350 by which the exemplary device 300 may communicate with components external to the exemplary device 300. At least one of the external communication interfaces 350 may be configured to facilitate a communication link with, for example, a remote monitoring facility of a device manufacturer for remotely monitoring operations of the exemplary system 300 and an image forming device with which the exemplary system 300 may be associated in operation. The external communication interface 350 may provide a communication portal for accepting updates to identifying information that may be stored locally for comparison with the information read from 2D labeling on a solid ink CRU. The external communication interface 350 may be configured to alert the remote monitoring facility to operation of the image forming device with which the exemplary system 300 is associated with an identified invalid solid ink CRU.

The exemplary device 300 may a UV label illuminating device 360 that may be operated in cooperation with a UV label imaging device 370 to collect information from the non-visually discernible 2D labeling provided as a UV ink barcode on a surface of the solid ink CRU. The UV label imaging device 370 may be a camera or other like device by which a surface labeling on an exposed surface of a solid ink CRU may be read and the information read from the 2D labeling thereon initially interpreted. No particular configuration to the UV label imaging device 370 is to be implied by this disclosure as it is recognized that many different devices for surface imaging and/or automated visual inspection under UV lighting conditions may be used. UV enhanced visual machine inspection of molded products and/or parts, including solid ink CRUs, may be according to known and/or well-established practices.

The exemplary device 300 may include a compatibility (confirming/inhibiting/overriding) device ("compatibility device") 380 that may take the information read from the 2D labeling by the UV label imaging device 370 and compare that information to compatibility or authenticating information stored in the data storage device 330. The comparing may determine that an installed solid ink CRU is compatible with, and/or authorized for use in, the image forming device. Based on this determining, the compatibility device 380 may send a signal via the processor 320 to the data output/display device 340 to advise a user of any effect on operations of the image forming device that may occur based on the detection of a determined invalid installed solid ink CRU. One or more actions may be taken by the user to acknowledge or override image forming operations being inhibited in the image forming device including those actions described in the varying operating scenarios above.

All of the various components of the exemplary device 300, as depicted in FIG. 3, may be connected internally, and to an image forming device within which the exemplary device is mounted or with which the exemplary device is associated, by one or more data/control busses 390. These data/control busses 390 may provide wired or wireless communication between the various components of the exemplary device 300, whether all of those components are housed integrally in, or are otherwise external and connected to an image forming device with which the exemplary device 300 may be associated.

It should be appreciated that, although depicted in FIG. 3 as an integral unit, the various disclosed elements of the exemplary device 300 may be arranged in any combination of sub-systems as individual components or combinations of components, integral to a single unit, or external to, and in wired or wireless communication with the single unit of the exemplary device 300. In other words, no specific configuration as an integral unit or as a support unit is to be implied by the depiction in FIG. 3. Further, although depicted as individual units for ease of understanding of the details provided in this disclosure regarding the exemplary device 300, it should be understood that the described functions of any of the individually-depicted components may be undertaken, for example, by one or more processors 320 connected to, and in communication with, one or more data storage device(s) 330.

Figure 4:
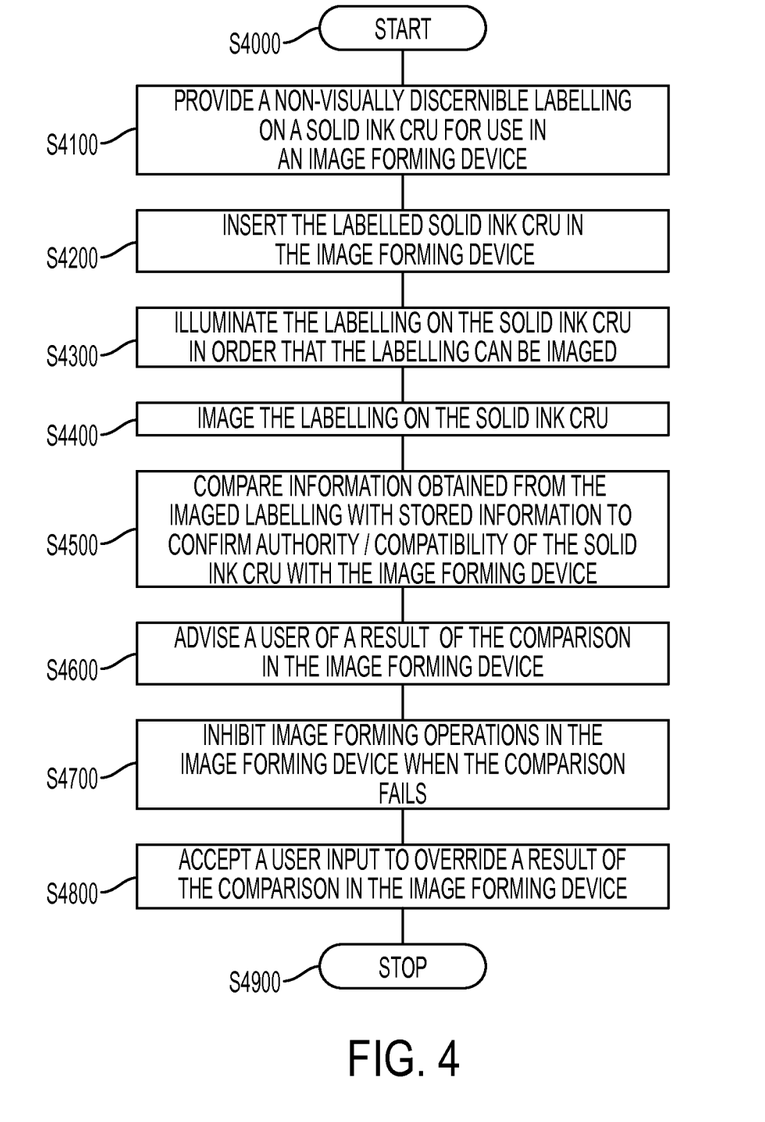
FIG. 4 illustrates a flowchart of an exemplary method for effecting authenticating of solid ink CRUs in support of a verification scheme in an image forming device according to this disclosure.

The disclosed embodiments may include an exemplary method for effecting authenticating of solid ink CRUs in support of a verification scheme in an image forming device. FIG. 4 illustrates a flowchart of such an exemplary method. As shown in FIG. 4, operation of the method commences at Step S4000 and proceeds to Step S4100.

In Step S4100, at least one non-visually discernible ink labeling, such as a UV ink printed labeling, may be provided on a solid ink CRU for identification of that CRU. Operation of the method proceeds to Step S4200.

In Step S4200, an appropriately labeled solid ink CRU may be inserted in an image forming device for use. Operation of the method proceeds to Step S4300.

In Step S4300, the UV ink labeling on the solid ink CRU may be appropriately illuminated by being exposed to a UV light source that may reveal the non-visually discernible labeling on the solid ink CRU in order that the labeling is available for imaging. Operation of the method proceeds to Step S4400.

In Step S4400, a properly illuminated labeling may be imaged by a surface imaging device such as, for example, a camera to collect the information available in the labeling. Operation of the method proceeds to Step S4500

In Step S4500, information collected from the surface scan of the properly illuminated 2D labeling on the surface of the solid ink CRU may be compared with compatibility and/or authorizing information that may be stored in a data storage device. An objective of the comparing is to determine, based on the available information, that the solid ink CRU may be compatible with, and/or authorized for use in a particular image forming device. Failure of the comparison may result in the device failing to operate, for example, based on the solid ink CRU being determined to be unauthorized for use in, and/or incompatible with, the image forming device. Operation of the method proceeds to Step S4600.

In Step S4600, a result of the comparing may be provided to a user. The result of the comparing may be displayed, for example, on a GUI or other display device on, or associated with, the image forming device. Operation of the method proceeds to Step S4700.

In Step S4700, a routine in the image forming device may inhibit or modify operation of the image forming device as discussed in the above scenarios. Operation of the method proceeds to Step S4800.

In Step S4800, a user may be afforded an option to input information to the image forming device to override the inhibition of operations, or otherwise to direct that image forming operations proceed, in instances where an installed solid ink CRU is determined to be invalid. The user input may be in the form of some manner of release code that may be made available to the user by the device manufacturer for use. Further, indications of attempts by a user to operate the image forming device with invalid solid ink CRUs, initially or via an override option, may be recorded and stored, or transmitted to a manufacturer, in order that the manufacturer may be made aware of such attempts, for example, in contractually managed devices. Operation of the proceeds to Step S4900, where operation of the method ceases.

As indicated above, the method may positively provide an authentication mechanism that makes use of non-visually discernible markings as virtual CRUMs on molded product CRUs, including solid ink CRUs, for identification of those CRUs.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in producing, identifying and using molded products, including solid ink products, in the devices in which they are intended to be employed.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method of identifying a solid ink product, comprising:
   providing a solid ink product with a non-visually discernible labeling;
   imaging, with a sensor, a surface of the solid ink product in a manner that exposes, records and interprets information in the labeling;

comparing, with a processor, the information obtained from the labeling with stored identification information for the solid ink product;
assessing, with the processor, at least one of an identification, authorization or compatibility of the solid ink product based on the comparing; and
outputting a result of the assessing.

2. The method of claim 1, the non-visually discernible labeling comprising a two-dimensional barcode applied to the solid ink product using an ultraviolet ink.

3. The method of claim 2, the imaging the surface of the solid ink product with the sensor comprising illuminating the two-dimensional barcode with an ultraviolet illuminating source, the sensor being a compatible ultraviolet imaging device.

4. The method of claim 3, the ultraviolet illuminating source and the compatible ultraviolet imaging device being housed in an image forming device,
the method further comprising inhibiting an operation of the image forming device when the assessing concludes that the solid ink product is at least one of unidentifiable by, unauthorized for use in, or incompatible with the image forming device.

5. The method of claim 4, further comprising displaying information regarding the assessing and the inhibiting to a user on a display device associated with the image forming device.

6. The method of claim 5, further comprising:
providing the user with one or more options for overriding the inhibiting of the operation of the image forming device,
the processor accepting a user input selecting one of the one or more options and overriding the inhibiting of the operation of the image forming device according to the user-selected one of the one or more options.

7. The method of claim 6, the user-selected one of the one or more options including entering a code that modifies a result of the assessing directing that the solid ink product be determined usable by the image forming device.

8. The method of claim 7, the code being obtained from a manufacturer of the image forming device.

9. The method of claim 7, further comprising storing information on attempts to operate the image forming device with the solid ink product that the assessing concludes is the at least one of unidentifiable by, unauthorized for use in, or incompatible with the image forming device.

10. The non-transitory computer readable medium of claim 2, the imaging the surface of the solid ink product comprising illuminating the two-dimensional barcode with an ultraviolet illuminating source, the sensor being a compatible ultraviolet imaging device in the image forming device.

11. The non-transitory computer readable medium of claim 10, the method further comprising inhibiting an operation of the image forming device when the assessing concludes that the solid ink product is at least one of unidentifiable by, unauthorized for use in, or incompatible with the image forming device.

12. The non-transitory computer readable medium of claim 11, the method further comprising displaying information regarding the assessing and the inhibiting to a user on a display device associated with the image forming device.

13. The non-transitory computer readable medium of claim 12, the method further comprising:
providing the user with one or more options for overriding the inhibiting of the operation of the image forming device;
accepting a user input selecting one of the one or more options; and
overriding the inhibiting of the operation of the image forming device according to the user-selected one of the one or more options.

14. The non-transitory computer readable medium of claim 13, the user-selected one of the one or more options including entering a code that modifies a result of the assessing directing that the solid ink product being deemed usable by the image forming device, the code being obtained from a manufacturer of the image forming device.

15. The non-transitory computer readable medium of claim 13, the method further comprising storing information on attempts to operate the image forming device with the solid ink product that the assessing concludes is the at least one of unidentifiable by, unauthorized for use in, or incompatible with the image forming device.

16. The method of claim 1, the sensor being a camera.

17. A system for identifying a solid ink product for use in an image forming device, comprising:
an imaging device that exposes and images a non-visually discernible labeling applied to a solid ink product in an image forming device, the imaging device exposing, recording and interpreting information in the labeling;
a comparing device that compares the information obtained from the labeling with stored identification information for the solid ink product;
an assessing device that assesses at least one of an identification, authorization or compatibility of the solid ink product with the image forming device based on the comparing; and
a display device that displays a result of the assessing.

18. The system of claim 17, the non-visually discernible labeling comprising a two-dimensional barcode applied to the solid ink product using an ultraviolet ink.

19. The system of claim 18, the imaging device exposing a surface of the solid ink product including the two-dimensional barcode with an ultraviolet illuminating source and imaging the illuminated surface.

20. The system of claim 19, further comprising an operation inhibiting device that inhibits an operation of the image forming device when the assessing concludes that the solid ink product is at least one of unidentifiable by, unauthorized for use in, or incompatible with the image forming device.

21. The system of claim 20, the display device displaying information regarding the inhibiting and providing a user with one or more options for overriding the inhibiting of the operation of the image forming device,
the system further comprising:
a user interface by which the user selects one of the one or more options; and
an overriding device that overrides the inhibiting of the operation of the image forming device according to the user-selected one of the one or more options.

22. The system of claim 21, the user-selected one of the one or more options including entering a code that modifies a result of the assessing to direct the overriding device to override the inhibiting of the operation of the image forming device by deeming the solid ink product usable by the image forming device, the code being obtained from a manufacturer of the image forming device.

23. The system of claim 22, further comprising a data storage device that stores the identification information for the solid ink product in a manner that is updateable by the user via the user interface and that automatically stores other information on attempts to operate the image forming device with the solid ink product that the assessing device concludes is the at least one of unidentifiable by, unauthorized for use in, or incompatible with the image forming device.

24. A non-transitory computer readable medium storing instructions which, when executed by a processor, cause the processor to carry out the steps of a method for identifying a solid ink product in an image forming device, the method comprising:
- imaging a surface of a solid ink product that is provided with a non-visually discernible labeling with a sensor that exposes, records and interprets information in the labeling;
- comparing the information obtained from the labeling with stored identification information for the solid ink product;
- assessing at least one of an identification, authorization or compatibility of the solid ink product with the image forming device based on the comparing; and
- outputting a result of the assessing.

25. The non-transitory computer readable medium of claim 24, the non-visually discernible labeling comprising a two-dimensional barcode applied to the solid ink product using an ultraviolet ink.

* * * * *